May 18, 1948.  C. L. PAULUS  2,441,593
ELECTRIC SERVOMOTOR UNIT
Filed May 27, 1944  5 Sheets-Sheet 1

INVENTOR.
CHARLES L. PAULUS
BY
ATTORNEYS

May 18, 1948. C. L. PAULUS 2,441,593
ELECTRIC SERVOMOTOR UNIT
Filed May 27, 1944 5 Sheets-Sheet 2

INVENTOR.
CHARLES L. PAULUS
BY
ATTORNEYS

May 18, 1948.   C. L. PAULUS   2,441,593
ELECTRIC SERVOMOTOR UNIT
Filed May 27, 1944   5 Sheets-Sheet 3

INVENTOR.
CHARLES L. PAULUS
BY
AND
ATTORNEYS

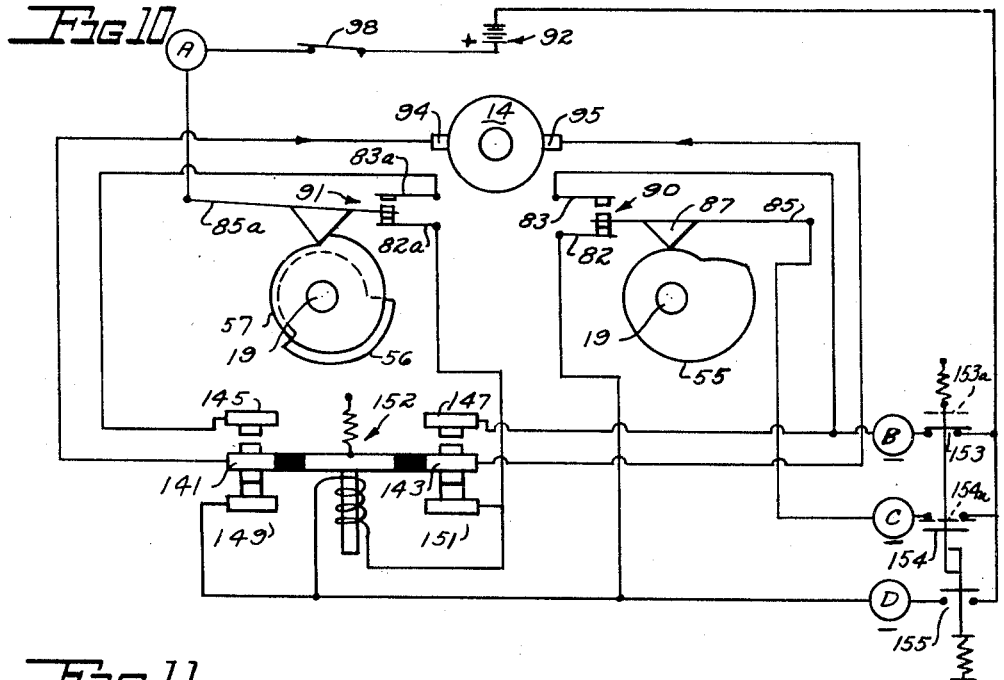
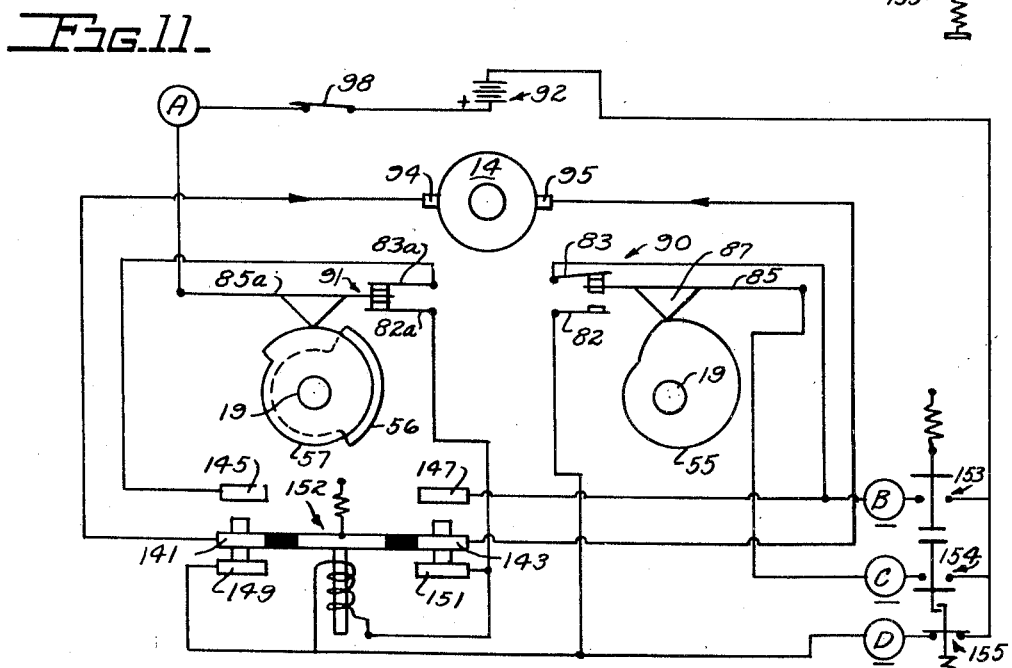
INVENTOR.
CHARLES L. PAULUS
BY
AND
ATTORNEYS

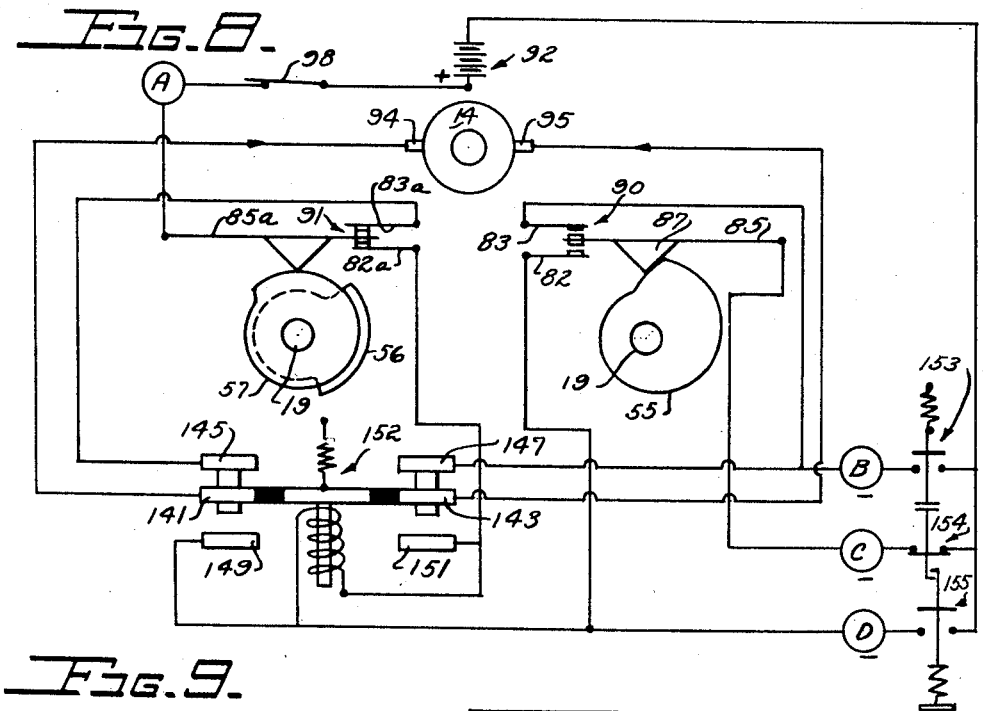
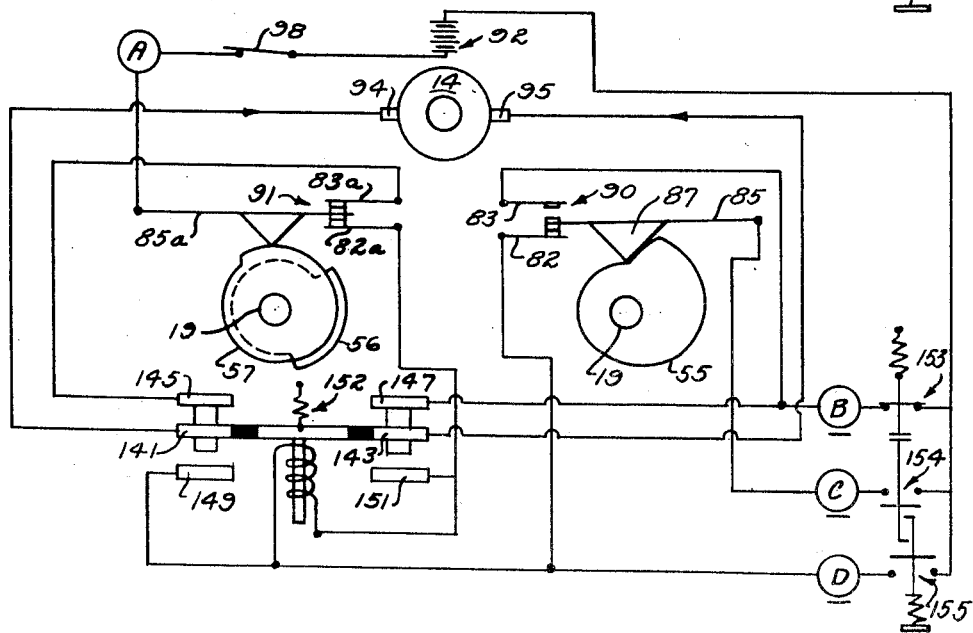

Patented May 18, 1948

2,441,593

UNITED STATES PATENT OFFICE 2,441,593

ELECTRIC SERVOMOTOR UNIT

Charles L. Paulus, Dayton, Ohio

Application May 27, 1944, Serial No. 537,671

2 Claims. (Cl. 318—297)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in servomotor units or "power packages" as they are sometimes called. Units of this kind are employed on radio-controlled airplane targets, on railway, land borne and water borne targets, on power driven (flying) bombs, on glide bombs, on automatic pilots, and at various points on aircraft, such as for the control of engine throttles, elevators, cowl flaps, automatic propellers, retractable landing gear, and pressure cabin vents. In general these units consist of a small electric motor, under the direct control of an operator or controlled automatically, a train of reduction gearing driven by the motor, a torque arm moved by the gearing and connected mechanically with the object to be controlled, cams operated by the gearing, and limit switches operated by the cams and connected in the motor circuit to control the extent of movement of the torque arm. This broad combination is old, being shown in a number of patents, for example, Patent No. 2,307,781 to Holloman, Paulus and Stout, dated January 12, 1943.

An object of this invention is to provide an improved servomotor unit wherein the limit switches are readily adjusted manually from the exterior of the unit housing. A more specific object is to provide disks which are secured to the cams which operate the limit switches, these disks being then clamped to the torque arm so that the adjustment will not change during operation. Another object is to provide a centering switch to control the position of the torque arm, said centering switch being adjustable in the same manner as the limit switches. Other objects will be apparent from the following description of a preferred embodiment of the invention.

In the accompanying drawings forming a part of this specification:

Figure 2:
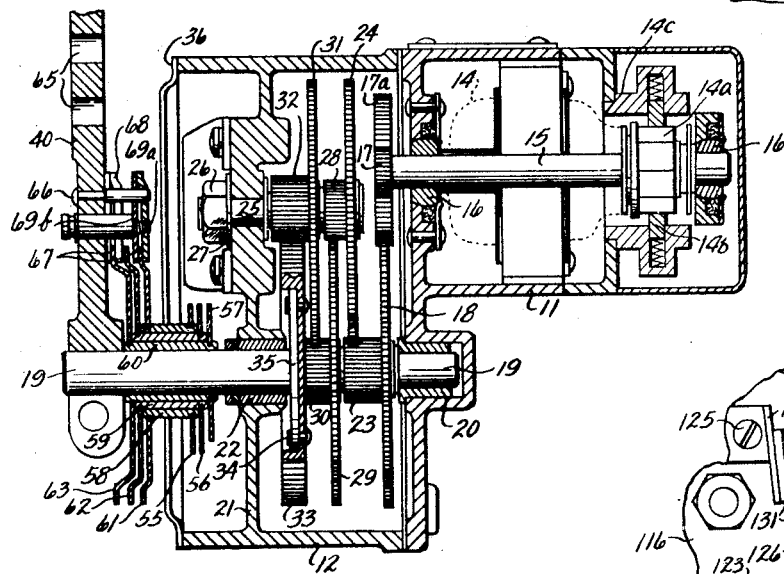
Fig. 2 is a horizontal section, through a unit, on a full size scale, showing part of the motor in phantom.

Referring particularly to the drawings, and first to Fig. 2, the servomotor unit has a motor housing 11 detachably secured to a casing 12 which encloses a set of reduction gears, cams, limit switches, and other parts to be described. Also detachably secured to casing 12 is a relay housing 13 which encloses relays not shown except schematically in the wiring diagram. These relays are coupled into the circuit of a direct current reversible motor 14, as will be understood from the wiring diagram Fig. 8, and automatically connect or disconnect the motor when the limit switches make and break the relay circuits. Motor 14 has a commutator 14a and a pair of brushes 14b carried on a brush holder 14c, and may run on 6 v., 12 v. or 24 v. current, such as is available in aircraft. Motor 14 also has a shaft 15 rotating in self-aligning bearings 16 which are supported by the motor housing 11, and said shaft extends outside of housing 11 and into casing 12. A pinion 17 is secured to motor shaft 15 and meshes with a spur gear 17a which is supported on a stub shaft (not shown) fixed to casing 12. Spur gear 17a meshes with a larger spur gear 18 which is carried by and rotates freely on a shaft 19 journaled in the casing 12 at one end as indicated at 20. A wall 21, which is integral with casing 12, but located within the confines of the latter, has a journal 22 aligned with the journal 20 to provide a second bearing for shaft 19. Secured to spur gear 18 is a pinion 23 which meshes with a large spur gear 24 rotatable on a stub shaft 25, the latter being fixed to wall 21 by a lock nut 26 and washer 27. Secured to spur gear 24 is a pinion 28 which drives another large spur gear 29 which is freely rotatable on shaft 19. Still another pinion 30 is fixed to spur gear 29 and meshes with a large spur gear 31, a pinion 32 being secured to the gear 31, both rotating freely on the stub shaft 25. Pinion 32 meshes with a large gear 33 which is secured by rivets 34 to a circular flange 35 integral with shaft 19, so that shaft 19 is forced to turn with spur gear 33. Shaft 19 extends well beyond the casing 12, and when the motor is energized, provides a slowly moving shaft which is oscillatable in one direction or the other according to the direction of rotation of the motor. The speed of shaft 19 may be about 1.33 to 3.0 R. P. M., and its torque may be from 75 to 150 inch pounds with gear ratios of 2800:1 down to 615:1. A split or two-part plate 36 is made fast by screws 37 to the end of casing 12, primarily to protect the limit switches and their contacts. Thus the motor, reduction gear train, relays, wiring and switches are fully enclosed by a protective housing.

Figure 1:
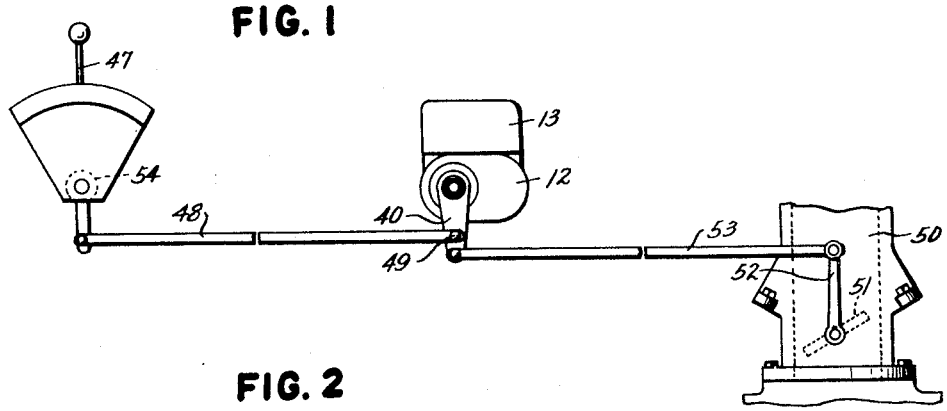
Fig. 1 is a diagrammatic view showing an embodiment of the invention in use as a throttle motor in an airplane.
Figure 5:
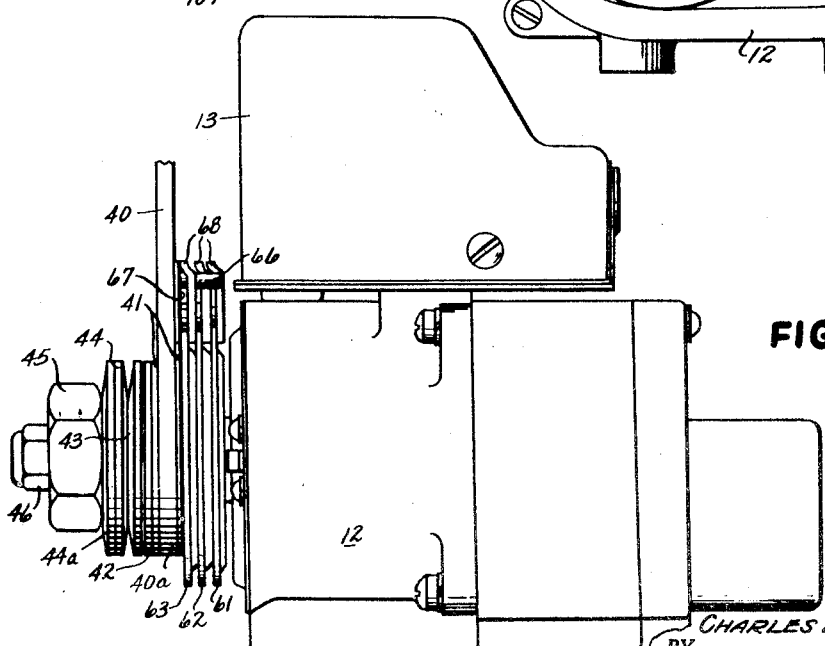
Fig. 5 is a side elevation, partly broken away, of the unit of Fig. 4.
Figure 12:
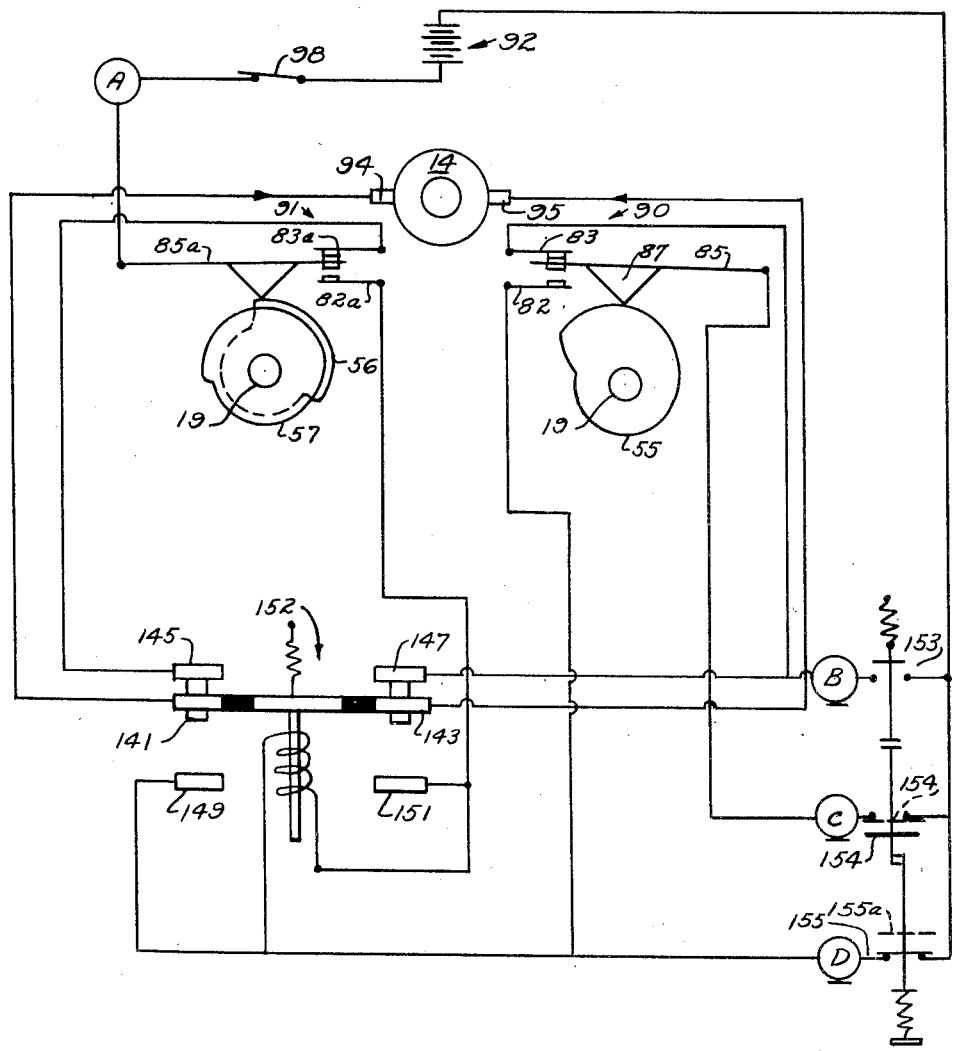

At or adjacent the end of the shaft 19 and carried thereby is a lever 40 which may be termed a torque arm. In the form of Fig. 2, lever 40 is keyed or otherwise rigidly secured to shaft 19. However, for many uses the torque arm should be clutched to the shaft. The preferred form of clutch comprises a pair of friction disks 41 (Fig. 5) carried by shaft 19 which bear on either side of the enlarged lower end 40a of the torque arm. A set of dished spring metal washers 42, 43, 44, 44a are also carried by shaft 19 and a large nut 45 is threaded on the end of the shaft 19, being locked by lock nut 46. When nut 45 is tightened against the set of washers, the friction disks are tightened against the base of the torque arm, and the latter then must oscillate with shaft 19. However, the construction is such that a superior force may cause the torque arm to slip on shaft 19, and this is especially important when the servomotor unit is being employed in an arrangement like the one illustrated in Fig. 1, to which reference should now be made.

Hand throttle lever 47 is shown pivotally connected to rod 48 to which the outer end of the torque arm 40 of one of the servomotor units is connected as at 49. A carburetor 50 has a butterfly valve 51 controlled by an arm 52 whose outer end is pivotally connected with rod 53 which extends to a pivotal connection with the torque arm. Normal operation by remote control will permit the hand throttle lever 47 and the butterfly valve 51 to be moved between the limits set by the limit switches upon rotation of the unit motor. Since the gear train may be self-locking due to the necessary high gear ratios, manual (overpowering) operation of the hand throttle lever will cause the butterfly valve to be moved to the desired position because the clutch adjacent the torque arm will permit the torque arm to change its angular position or slip relative to drive shaft 19. A conventional drag or friction clutch 54 is provided on the hand throttle assembly to maintain the pre-set throttle position, but in an arrangement like that of Fig. 1, clutch 54 is removed or loosened since its function is assumed by the clutch adjacent the torque arm. This arrangement is of value because it obviates overcoming the friction of clutch 54 by the power of the servomotor, and permits the operation, in an emergency, of the hand throttle without overloading the motor or damaging the gear train.

Figure 3:
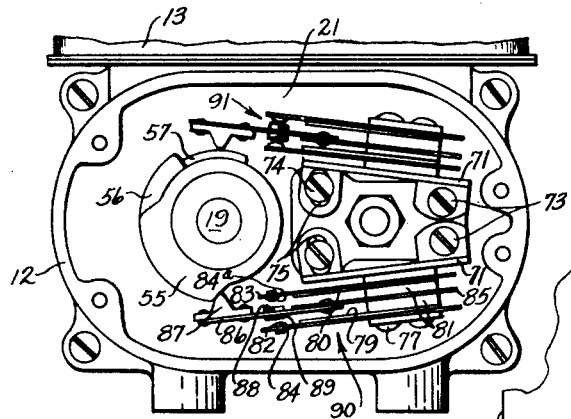
Fig. 3 is an end elevation with the cover plate removed to show the limit switches, the relay housing being broken away.

Referring to Figs. 2 and 3, there are three cams 55, 56, and 57 which operate the switches to be described, said cams each being preferably a flat metal disk made fast to a cylindrical sleeve carried by shaft 19 and extending outside of plate 36. Preferably there are three telescoped sleeves 58, 59, 60 for the cams 55, 56, and 57, respectively, and the outer sleeve 58 is shortest, the inner sleeve 60 being longest, all the sleeves being relatively rotatable. Cam-adjusting disks 61, 62, 63, are secured to the outer ends of sleeves 58, 59, 60, respectively. Disks 61, 62, 63 and also the cams 55, 56, 57 may be fastened to the opposite ends of their respective sleeves by a spinning process, or they may be soldered or welded. If preferred, either the disks or the cams may be integral with their respective sleeves. Obviously, the cams, sleeves, and disks, once assembled, form a unitary assembly which may be slipped over the end of shaft 19. Disks 61, 62, 63 are dished and generally speaking are nested, but are spaced slightly apart to permit each disk to be gripped by clamping devices to secure it to the torque arm as will now be described. The dished shapes of the disks 61, 62, 63 ensure the proper spacing apart of the disk edges and also the necessary spacing of said edges from the plate 36 to give clearance for the clamping devices as the latter swing with the torque arm.

The torque arm 40 is provided with several apertures 65 located toward its free end to permit attachment of the throttle control rod 48 thereto at different points to vary the moment arm. At points about midway between the ends of the torque arm three straight pins 66 are fixed, these pins projecting inwardly from the inner face of the torque arm. Carried on each pin 66 are a pair of clamping jaws 67, 68, jaws 68 being at least twice as thick as jaws 67. The clamping jaws 67, 68 of each pair are separate parts pressed together at their outer ends, while the inner ends of each pair of clamping jaws lie on opposite sides of one of the disks 61, 62, 63. Three clamping screws 69 have heads on the outside of the torque arm and have smooth shanks passing through the torque arm as shown, with reduced ends 69a provided with screw threads which engage threads in the thick clamping jaws 68. The shoulders 69b on the screws 69 engage the outer faces of the thin clamping jaws 67. When screws 69 are turned by a screw driver, jaws 67 cannot move as a whole because of shoulders 69b, but jaws 68 are pulled in, and the ends of the relatively flexible jaws 67 bend to frictionally grip the disk edges. The result is, each disk is secured rigidly to the torque arm to swing therewith. As the torque arm is normally clutched to shaft 19, the disks likewise swing with shaft 19, causing the cams 55, 56, 57 to oscillate to an equal extent. A strong spring wire 70 (Fig. 4) is bent under the head of the middle screw 69 and over the heads of the two outer screws to prevent said screws from turning, once they have been set up to grip the disks.

Figure 6:
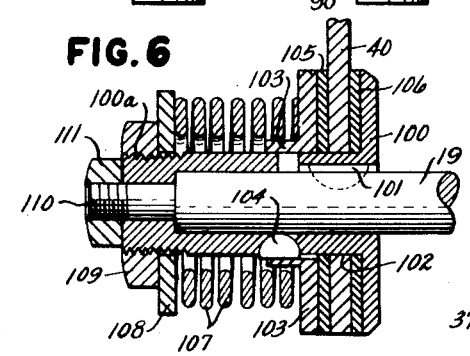
Fig. 6 is a detail sectional view showing a modified form of clutch.

By the described construction shown in detail in Fig. 6, the torque arm will normally oscillate with the motor-driven shaft 19, yet may move independently of said shaft if suddenly subjected to a powerful thrust, without injury to any of the parts. Furthermore, whatever the movement of the torque arm, the cams will partake of the same angular movement, or in other words, the cams will participate in all motions of the torque arm whether derived from the driving motor 14 or from an overpowering force exerted by the pilot on the throttle lever, for example. The cams can never change their adjustment or angular relationship to the torque arm, unless such adjustment is deliberately made. In order to change that adjustment, each of the screws 69 must be turned to loosen the grip of the pairs of clamping jaws 67, 68 on the cam-adjusting disks. When these disks are no longer clamped, they may be turned by the fingers of the operator, without disconnecting or disassembling any parts, and the cams will turn with them to effect different action of the limit and centering switches, which will now be described.

In the embodiment of Fig. 3, the limit switch and centering switch assemblies each comprise a bracket 71 secured at one end to the wall 21 by a screw 73. Another screw 74 passing through an arcuate slot 75 in the opposite end of each bracket 71 will cooperate with screw 73 to hold the bracket rigidly on wall 21, while permitting angular adjustment of the bracket, screw 73 serving as a pivot when the angular adjustment is being made. Secured to each bracket 71 by screws 77 are a pair of parallel metal strips 79, 80 held apart by insulating blocks 81 through which screws 77 also pass. Adjacent each metal strip 79, 80 are conductors 82, 83, said conductors being preferably flexible metal strips of high conductivity. Conductors 82, 83, are soldered at their upper ends to wires (see Fig. 8) or other leads connected to the relays in housing 13. Opposed contacts 84 are at the free ends of each pair of conductors 82, 83. Another conductor 85, also of flexible spring metal of high conductivity, is midway between conductors 82, 83 and spaced therefrom by insulators 81. An extension piece 86 is riveted to each conductor 85 and carries an insulating cam follower 87 which rides over the edge of one of the cams as the latter is oscillated. Contacts 88, 89 are on opposite sides of each extension piece 86 to make contact with either contact 84 as the moving cam swings the extension piece in one direction or the other. Extension pieces 86 may be insulators as the current flows only through conductors 82, 83, contacts 84, contacts 88, 89 and the central conductors 85. The limit switch and centering switch assemblies on opposite sides of shaft 19 are substantially alike, except that both sides of the centering switch are normally open while both sides of the limit switch are normally closed, and the cams which actuate them will have different angular adjustments to effect operation of the switches at different times. Metal strips 79, 80 insure proper action of the flexible conductors 82, 83, since they prevent excessive bending of said conductors and cause a quick break at the contacts. The resiliency of the central conductors 85 tends to hold each cam follower on the cam, and this tendency may be greatly augmented by adjusting brackets 71 toward shaft 19.

Figure 4:
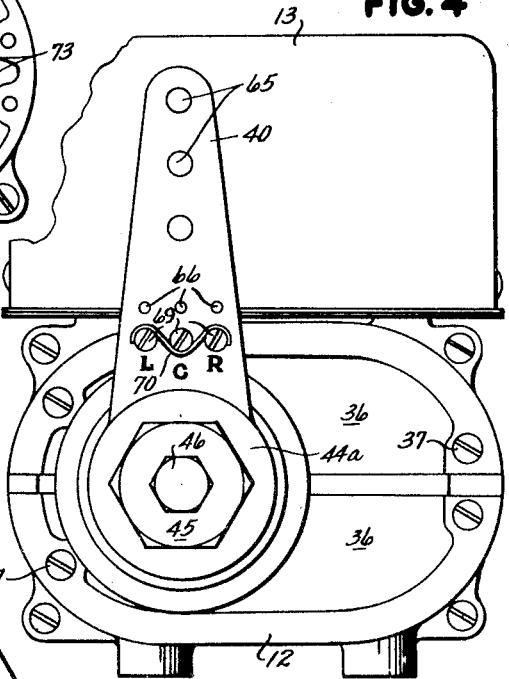
Fig. 4 is an end elevation, partly broken away, showing a unit employing a clutch.

The limit switch assembly, generally designated by 91, will cause the torque arm to swing to one limit of movement and then by reversal of the motor, to swing to the other limit of movement, and so on, assuming the proper connections are made and the motor is energized. However, it has been previously stated that there are three cams with three adjusting disks, although but two cams are necessary to control the limits of movement. The third cam is provided to effect an automatic centering of the torque arm. Fig. 4 shows that letters "L," "C," and "R" are stamped on the lower part of the torque arm, each letter being directly below one of the clamping screws 69. "L" indicates the adjustment for left movement, "R" the adjustment for right movement, and "C" the adjustment for centering. The action of the centering switch, generally designated by 91, is to stop the torque arm always at the "center," which is adjustable and hence need not be centrally disposed or halfway between the limits of movement but may be anywhere between said limits.

Figure 8:
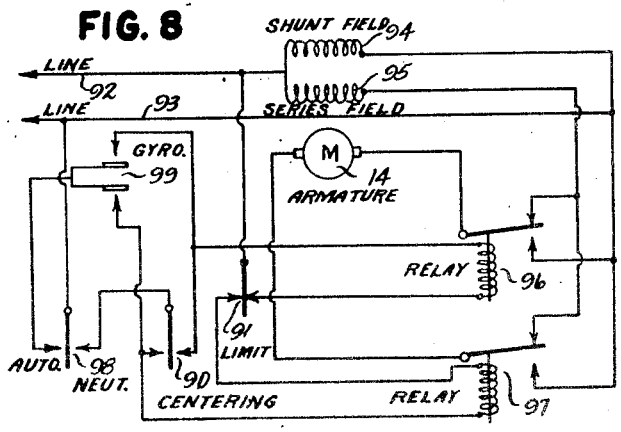
Fig. 8 is a wiring diagram of the electric circuit.

Referring to the wiring diagram, Fig. 8, the motor used is of the compound direct current type having a shunt field 94 connected across the power lines 92 and 93, and a series field 95 connectible to the armature of the motor 14 through relays 96 and 97, whereby the motor 14 may be reversed by changing the direction of flow of current through the armature.

A manually operable master switch 98 preferably located in the pilot's compartment and an automatic switch 99 which may be gyroscopically operated as in an automatic pilot are both shown with both sides open, that is, in the position they occupy when the device is not in use, whereby no current flows to the coils of relays 96 and 97 and the relays therefore both remain open as shown and the motor 14 therefore remains at rest.

For automatic operation of the device, the master switch 98 is shifted to its left contact whereby current is conveyed to the automatic switch 99. When thereafter an unwanted change in the attitude of the plane causes the automatic switch 99 to engage its upper contact, current will be directed from said upper contact to the coil of the relay 96, and will return through the right contact of the limit switch 91 to the power line 92 whereby the relay 96 will operate to engage its lower contact, thereby completing a circuit from the power line 93 through the lower contact of the relay 96 through the armature of the motor 14, through the upper contact of the relay 97 and back to the power line 92, whereby the motor 14 will be operated in a direction to correct the unwanted attitude until such correction disengages the upper contact of the automatic switch 99, or, if that is too long delayed, until the limit switch 91 disengages its right contact and thereby de-energizes the coil of the relay 96.

Conversely, when an opposite unwanted change in the attitude of the plane causes the automatic switch 99 to engage its lower contact, current will be directed from said lower contact to the coil of the relay 97 and will return through the left contact of the limit switch 91 to the power line 92, whereby the relay 97 will engage its lower contact, thereby completing a circuit from the power line 93 through the lower contact of the relay 97, through the armature of the motor 14, through the upper contact of the relay 96 and back to the power line 92, whereby the motor 14 will be operated in the other direction to correct the unwanted attitude until such correction disengages the lower contact of the automatic switch 99, or, if that is too long delayed, until the limit switch 91 disengages its left contact.

When both relays 96 and 97 are in the open position shown, the armature of the motor 14 is shorted on itself, thereby providing a powerful brake for quickly bringing the armature to rest when it is disconnected from the line current.

The structural details of the limit switch 91 and the limit switch operating cams 56 and 57 are shown in Fig. 3 as being in the central or neutral position where it will be seen that as long as the cam follower of the limit switch 91 rests on the cam 57 as shown, both sides of the limit switch 91 will remain closed, but that a predetermined rotation of the cams 56—57, in one or the other direction will open one or the other of the switches to stop rotation of the shaft 19. For purposes of illustration it may be assumed that energization of the coil of the relay 96 will operate the motor 14 in a direction which will rotate the cams 56—57 clockwise and energization of the coil of the relay 97 will operate the motor 14 in a direction which will rotate the cams 56—57 anticlockwise. The amount of rotation of the shaft 19 before rotation is arrested by the limit cams 56—57 may be adjusted by the clamp means 67, 68, 69 as hereinbefore explained.

The centering switch 90, also shown in detail in Fig. 3, is made to function by operating the master switch 98 to engage its right contact (NEUT). The centering switch is also shown in Fig. 3 as being in the center or neutral position, the cam followed 87 being midway between the high and the low surface of the cam 55, whereby both sides of the switch 90 are open.

Slight rotation of the centering cam 55 clockwise, however, will engage the upper contacts of the switch 90, Fig. 3 (left contact, switch 90, Fig. 8). When the cam 55 of the centering switch 90 is thus off center clockwise, the upper contacts of switch 90 Fig. 3 (left contact switch 90 Fig. 8) are engaged for anticlockwise rotation of the shaft 19. Thereafter, if the master switch 98 is moved to the right contact (NEUT), a circuit will be completed by way of the relay 87 for anticlockwise rotation of the cam 55 to return the shaft 19 to the central or neutral position. Obviously, when the master switch 98 is used to return the shaft 19 to the neutral position, the gyro switch 99 is momentarily disconnected from the electric circuit.

The above recites appropriate procedure for returning the shaft 19 to its central or neutral position by way of the manual switch 98 and centering switch 90 when it is clockwise off center. Obviously when it is anticlockwise off center the centering switch 90 will engage its right contact Fig. 8, which, upon movement of the switch 98 to NEUT, will rotate the shaft clockwise until the cam 55 and shaft 19 are returned to their home position. This home position may, however, be varied and adjusted by the clamping means 67, 68, 69 hereinbefore described.

Now referring to Fig. 6, the torque arm 40 is shown secured to shaft 19 by a different type of clutch; otherwise the action is exactly the same. Sleeve 100 is secured by a key 101 to the shaft and passes through a bore 102 in the end of the torque arm. Another sleeve 103 fits over sleeve 100 and is secured thereto by a key 104, so that the two sleeves cannot rotate relative to each other, but turn with the shaft. Torque arm 40 is free to swing on sleeve 100 but is normally frictionally gripped between friction disks 105, 106 on opposite sides. Sleeve 103 is slidable on key 104 and is pressed against disk 105 by a strong coil spring 107 which surrounds sleeve 100 and is confined by washer 108 and nut 109, the latter being threaded on a screw-threaded portion 100a of sleeve 100. Further to hold the parts together, shaft 19 has a reduced screw-threaded end portion 110 and a lock nut 111 is threaded on portion 110 to secure nut 109. Tension of the coil spring is adjusted by turning nut 109.

Figure 7:
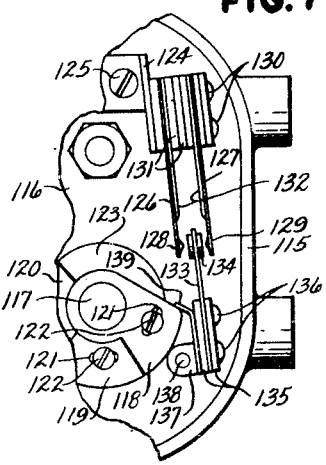
Fig. 7 is a fragmentary end elevation showing a modified form of limit switch.

In the modification of Fig. 7, a quick acting centering switch is shown. The servomotor housing 115 has a wall 116 which is like wall 21 and shaft 117, which projects through wall 116, is like shaft 19. Three cams 118, 119, 120 are indicated as mounted on shaft 117 and are angularly adjustable by means of arcuate slots 121 and screws 122 which pass through the slots and into a circular disk 123 fixed to shaft 117. A bracket 124 is supported by and swingable on a screw 125 which enters wall 116. Flexible conductors 126, 127 having contacts 128, 129 at their free ends are supported by screws 130 upon the bracket 124 and are spaced apart by insulating blocks 131 through which screws 130 also pass. Metal strips 132 support conductors 126, 127 and prevent said conductors from approaching too close to each other. Wires (not shown) are soldered or otherwise electrically connected to conductors 126, 127 and lead to the relays in the motor circuit. Contacts 128, 129 are spaced apart to provide a gap in which a conductor 133 may oscillate, conductor 133 having contacts 134 on its opposite faces at one end to close a circuit when either contact 128 or contact 129 is engaged. Conductor 133 is electrically connected to a lead (not shown) which is a part of the motor control circuit, and is carried between two insulating blocks 135 secured by screws 136 to a bracket 137, a pin 138 providing a pivot for said bracket. A cam follower 139 is also fixed by screws 136 to bracket 137 and rides over one or more of the cams, to effect oscillation of conductor 133 and closing of either of two circuits through contacts 134, 128, 129. The circuit closing or opening will be very rapid because the lift of the cam on follower 139 is multiplied by the ratio of the total length of conductor 133 to the length of the moment arm of the cam follower. The wiring diagram of Fig. 8 will be applicable to the construction of Fig. 7. While the switch of Fig. 7 is described as a centering switch, the same construction may be employed for the limit switch, although there must be one more conductor, between conductors 126 and 127, to make the two circuits controlled by the limit switch. It will likewise be clear that the cams of Fig. 7 may be adjusted in the manner described in connection with Fig. 2.

Many other changes and modifications may be resorted to within the scope of the appended claims.

What I claim is:

1. In an electric servo mechanism, a housing, speed reducing gearing within said housing, a reversible electric motor attached to the input end of said gearing for driving said gearing, a rocker shaft drivably secured to the output end of said gearing, bearings for rotatably supporting said rocker shaft within said housing, one end of said rocker shaft projecting through one wall of said housing, a rocker arm fast on said rocker shaft outside said housing, means for completing circuits through said electric motor for clockwise or anticlockwise operation of said rocker arm, a normally closed limit switch within said housing having one set of contacts separable for opening the motor circuit when said rocker arm has rocked away from a neutral position through a preselected clockwise angular movement and another set separable for opening the motor circuit when said rocker arm has rocked away from the neutral position through a preselected anticlockwise angular movement, a normally open centering switch within said housing having one set of contacts closable for reversing the motor circuit when the rocker arm has been rocked clockwise away from the neutral position, and another closable for reversing the motor circuit when the rocker arm has been rocked anticlockwise away from the neutral position, three cams within said housing, one for opening each set of contact points of the limit switch and the other for opening both sets of contact points of the centering switch, three concentric hollow shafts, the inner one rotatable on said rocker shaft and each rotatable within the next, one being drivably secured to each cam, said hollow shafts extending through the said one wall of said housing, three discs, one drivably secured on each hollow shaft outside said housing adjacent said rocker arm, and three clamps on said rocker arm, one for each disc for clamping a selected point on said disc to said rocker arm, whereby the cams within the housing may be adjusted outside the housing for arresting said rocker arm at selected angular positions.

2. In an electric servo mechanism, a closed housing, speed reducing gearing within said housing, a reversible electric motor attached to said gearing for driving said gearing, a rocker shaft drivably secured to the driven end of said gearing, bearings for rotatably supporting said rocker shaft, an end of said rocker shaft projecting through one wall of said housing, a rocking member fast on said rocker shaft outside said housing, means for completing circuits through said electric motor for clockwise or anticlockwise operation of said rocking member, a normally closed limit switch within said housing having one set of contacts separable for opening the motor circuit when said rocking member has rocked away from a neutral position through a preselected clockwise angular movement and another set separable for opening the motor circuit when said rocking member has rocked away from the neutral position through a preselected anticlockwise angular movement, a normally open centering switch within said housing having one set of contacts closable for reversing the motor circuit when the rocking member has been rocked clockwise away from the neutral position and another closable for reversing the motor circuit when the rocking member has been rocked anticlockwise away from the neutral position, a series of cams within said housing, for opening the contact points of the limit switch and the contact points of the centering switch, a series of concentric hollow shafts one drivably secured to each cam, said hollow shafts extending through the said one wall of said housing, a series of adjusting members, one drivably secured on each hollow shaft outside said housing adjacent said rocking member, and clamping means on said rocking member, one for each adjusting member for clamping a selected point on said adjusting member to a selected point on said rocking member, whereby the cams within the housing may be adjusted outside the housing for arresting said rocking member at selected angular positions.

CHARLES L. PAULUS.

REFERENCES CITED

The following references are of record in the file of this patent:

UNITED STATES PATENTS

| Number | Name | Date |
|---|---|---|
| 989,527 | Lawson et al. | Apr. 11, 1911 |
| 2,019,051 | Jeffrey et al. | Oct. 29, 1935 |
| 2,071,177 | Puffer | Feb. 16, 1937 |
| 2,183,886 | Hjulian | Dec. 19, 1939 |
| 2,249,237 | Fulton | July 15, 1941 |
| 2,307,781 | Holloman et al. | Jan. 12, 1943 |
| 2,360,179 | Urbas et al. | Oct. 10, 1944 |